United States Patent
Luce

(10) Patent No.: US 6,335,816 B1
(45) Date of Patent: Jan. 1, 2002

(54) POCKELS CELL AND OPTICAL SWITCH WITH POCKELS CELL

(75) Inventor: Jacques Luce, Gujan-Metras (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/555,699

(22) PCT Filed: Dec. 8, 1998

(86) PCT No.: PCT/FR98/02660

§ 371 Date: Jul. 7, 2000

§ 102(e) Date: Jul. 7, 2000

(87) PCT Pub. No.: WO99/30204

PCT Pub. Date: Jun. 17, 1999

(30) Foreign Application Priority Data

Dec. 9, 1997 (FR) .................................................. 97 15546

(51) Int. Cl.[7] .................... G02F 1/07; G02F 1/29
(52) U.S. Cl. ...................... 359/257; 359/249; 359/320
(58) Field of Search ........................... 359/257, 256, 359/254, 249, 245, 322, 320

(56) References Cited

U.S. PATENT DOCUMENTS 3,694,769 A * 9/1972 Hook et al. .................. 331/94.5
6,124,965 A * 9/2000 Doi et al. ...................... 359/248

OTHER PUBLICATIONS

Daly, High Average Power Pockels Cell Jan. 1, 1991, Statutory Invention Registration H868.*

* cited by examiner

Primary Examiner—Georgia Epps
Assistant Examiner—Timothy Thompson
(74) Attorney, Agent, or Firm—Burns Doane Swecker & Mathis LLP

(57) ABSTRACT

Dual Pockels cell containing:
- a bar (112) in electro-birefractive material having a first (122) and a second (124) end,
- a first and a second ring electrode (126, 128) deposited at the ends of the bar, and
- a third electrode (127) formed on the bar between the first and second electrodes.

Application to the fabrication of modulators or electro-optical switches.

9 Claims, 2 Drawing Sheets

POCKELS CELL AND OPTICAL SWITCH WITH POCKELS CELL

TECHNICAL FIELD

The present invention relates to a Pockels cell and a switch with a Pockels cell. By Pockels cell is meant an electro-optical cell able to change the polarisation of a beam crossing through it via the application of an electric field to the cell. Said cell may be cut in birefractive crystal whose cristallographic axes are deviated by the presence of an electric field parallel to the optical axis of the crystal. This warrants the name "Pockels cell with longitudinal field".

The Pockels cell of the invention is used in particular to produce switches or optical modulators.

Advantage of the invention may be taken in particular for the fabrication of regenerative amplifiers.

STATE OF THE PRIOR ART

Regenerative amplifiers use a trigger switch in two states. In a first state, photons are trapped and amplified in a laser cavity, while in the second state the photons are removed from the cavity.

To achieve the switch function, systems are used with which the polarisation of the laser beam can be switched by 90° by means of return excursion in a Pockels cell controlled by an electric voltage.

Conventionally a KDP (potassium-dihydrogen-phosphate) crystal bar is used having a length of 2 to 3 cm, whose ends are provided with electrodes.

To carry out optical switching in two states, it is necessary to successively apply two independent voltages of high potential (for example 4000 V) to each electrode in order to set up or cancel a polarising electric field in the cell. The quick changeover from one voltage to the other requires costly and complex electronic switching equipment. It proves to be difficult to provide electronic switching equipment which achieves both fast set-up of a high voltage on a terminal and fast cancellation of this voltage.

To avoid this difficulty, the single Pockels cell switch is replaced by a switch with two Pockels cells. Said switch is described in greater detail below with reference to appended FIG. 1.

Figure 1:
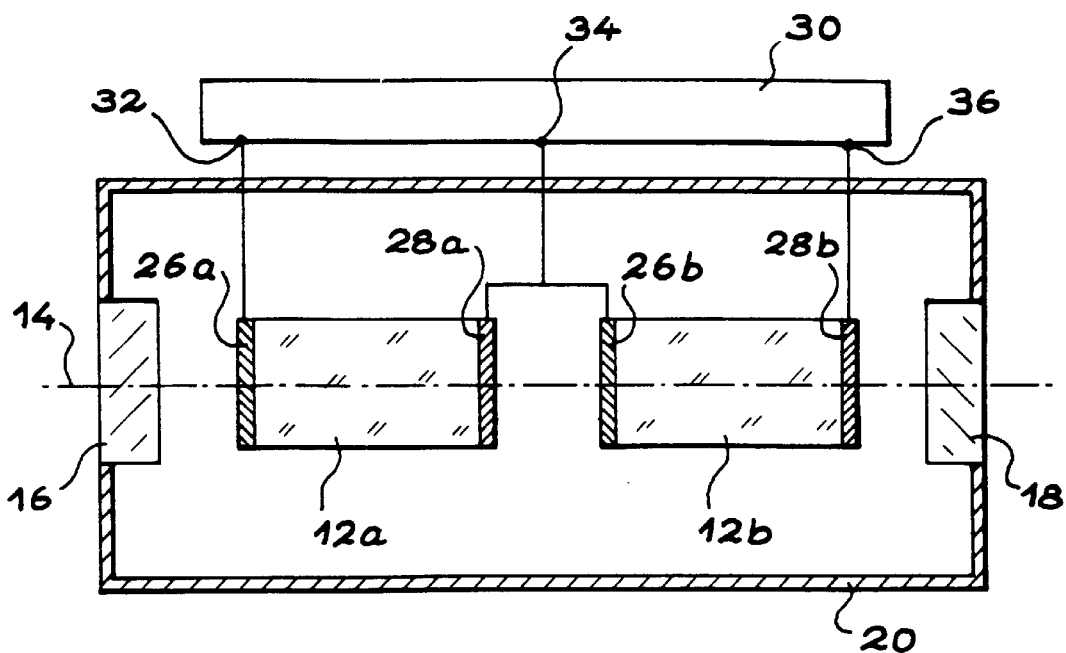

FIG. 1 shows a section of the switch 10 comprising two Pockels cells 12a and 12b aligned along an optical axis 14 between a first window 16 and a second window 18. The Pockels cells are enclosed in a sealed case 20 to provide protection from humidity. The switch also comprises polarisation or analysis means arranged in front of the windows that are not shown in the figures for reasons of clarity.

The Pockels cells 12a and 12b are each formed of a cylindrical KDP bar. At the ends of the KDP bars, ring-shaped electrodes 26a, 26b, 28a, 28b are formed. A voltage applied between the electrodes of a Pockels cell 12a, 12b, leads to creating an electric field, parallel to the optical axis 14, in the KDP bar.

The voltage applied to the electrodes is piloted by an electronic circuit 30 having three polarisation terminals 32, 34 and 36.

The first polarisation terminal 32 is connected to a first electrode 26a of the first Pockels cell 12a. The second terminal 34 is connected both to a second electrode 28a of the first Pockels cell 12a and to a first electrode 26b of the second Pockels cell 12b.

Finally, the third terminal 36 is connected to a second electrode 28b of the second Pockels cell.

The functioning of the switch is explained with reference to FIG. 2.

Figure 2:
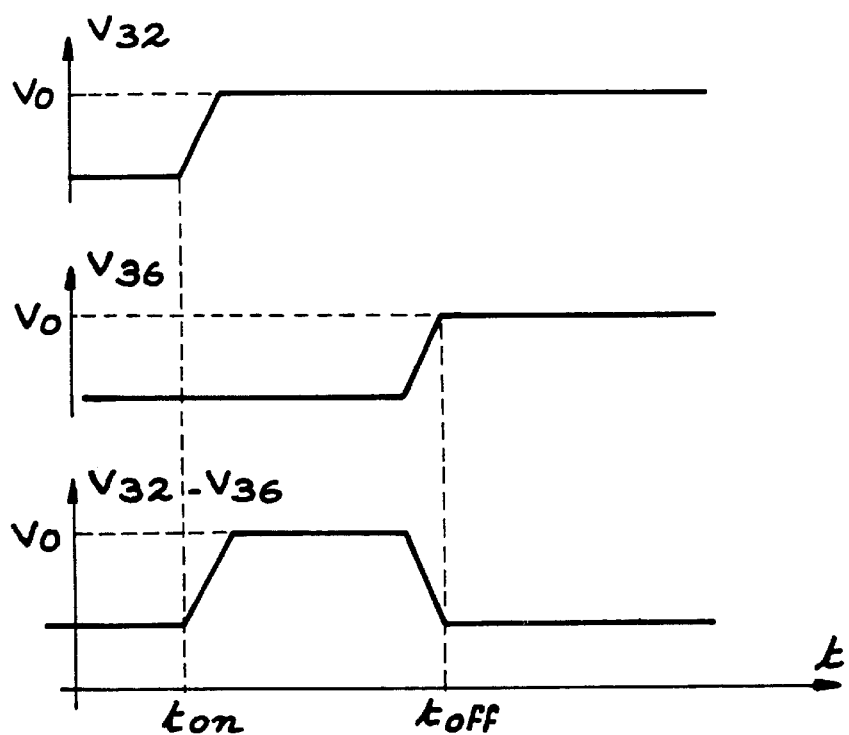

FIG. 2 shows in graph form the voltages $V_{32}$ and $V_{36}$ applied to the first and third terminals of the electronic circuit 30 in relation to time. It also shows the difference in voltage $V_{32}-V_{36}$.

Voltages $V_{32}$ and $V_{36}$ are expressed in relation to a mass potential which is applied in constant manner to the second terminal 34 of electronic circuit 30.

As from an initial switching time denoted $t_{on}$, a high voltage $V_0$ is applied to the first terminal 32. A beam crossing through the first Pockels cell subsequently undergoes a phase difference of $\lambda/4$ ($\lambda/2$ if the beam makes a return excursion within the cell). The second non-polarised cell does not cause any phase difference at this time.

A rise time is defined as being the time needed to set up the voltage $V_{32}$ of the first terminal at a high voltage value $V_O$, as from the time this terminal is at mass voltage. This rise time is in the order of 3 ns.

As mentioned previously, for electronic circuit construction-related reasons, it is difficult to achieve switching of a high voltage $V_0$ to the mass potential in a time that is as short as the rise time mentioned above. The rise time to set up the high voltage is therefore shorter than the time needed for its cancellation.

Therefore, to interrupt the polarisation effect of the first Pockels cell quickly, the high voltage $V_0$ is also applied to the third terminal 36, that is to say on the second Pockels cell.

The electric field set up in the second Pockels cell 12b is then opposite in direction to the field existing in the first Pockels cell 12a. The light beam undergoes a phase difference of $-\lambda/4$ in the second cell.

The beam crossing through the switch therefore undergoes a first phase difference of $-\lambda/4$ in the first cell 12a and a second phase difference of $-\lambda/4$ in the second cell 12b, and therefore emerges from the device with zero phase difference. The performance of the switch is then the same as in the state in which none of the cells are polarised. Fast optical switching can thus be obtained.

In FIG. 2, the time at which the voltage $V_{36}$ of the third terminal is established at value $V_0$ is indicated by $t_{off}$. It may be noted that the rise time of this voltage is also in the order of 3 ns.

Finally, the optical switch is open before time $t_{on}$ and after time $t_{off}$. During time $t_{off}-t_{on}$, called the laser impulse creation time, $V_{32}-V_{35}=V_0$ and the switch is closed since the total phase difference undergone by the light beam which effects a return excursion in the switch is $\lambda/2$ ($\lambda/4+\lambda/4$).

For additional information on the fabrication of the electronic circuit 30 of the device in FIG. 1, reference may be made to French patent application n° 96 10006 dated Jun. 8, 1996.

The fabrication of an electro-optical device such as described above encounters a certain number of difficulties among which particular mention may be made of the alignment of the Pockels cells.

Indeed it is, necessary to perfectly align the two Pockels cells 12a, 12b along the optical axis 14.

In addition, the use of two identical cells to increase switching speeds multiplies the production cost of the device.

Finally, when the beam crosses through the device, it meets the four faces of the Pockels cells and therefore undergoes fairly considerable attenuation of its intensity.

DESCRIPTION OF THE DISCLOSURE

The present invention sets out to provide a dual Pockels cell, that can be used for example in an optical switch such as previously described and which does not encounter the difficulties described above.

One purpose, in particular, is to provide said cell with which it is possible to fabricate a switch or an electro-optical modulator without taking any steps to align the optical cells along one same optical axis.

A further purpose is to provide a cheap electro-optical device in which the attenuation of a light beam may be reduced in comparison with known devices.

To achieve these purposes, the subject matter of the invention is more precisely a dual Pockels cell comprising:
- a single bar in birefractive material extending continuously between a first and a second end,
- a first and a second electrode, arranged at the ends of the bar,
- a third electrode, arranged on the bar between the first and second electrodes.

The electrodes are, for example, ring-shaped electrodes surrounding the bar around its circumference.

Via the third electrode, two electric fields, which may or may not be of opposite direction, may be set up, whether simultaneously or not, between the third electrode and the first and second electrodes.

Therefore, the bar of birefractive electro-optical material may be used in the same way as two Pockels cells aligned along one same axis.

However, a beam of light crossing through the cell of the invention only meets two end faces and is therefore only weakly attenuated.

Also, the cost of fabricating a dual cell of the invention is substantially the same as that for an ordinary single cell with two electrodes.

According to one particularly advantageous embodiment, the third electrode may be positioned substantially equidistant from said first and second electrodes.

Through this characteristic, an electric field of same intensity may be formed in the cell either side of the third electrode, through the application of a voltage of the same value to the first and second end electrodes.

Other characteristics and advantages of the invention will emerge more clearly from the following description which refers to the figures of the appended drawings. This description is given solely for illustration purposes and is non-restrictive.

SHORT DESCRIPTION OF THE FIGURES

FIG. 1, already described, is a section diagram of an electro-optical switch, of known type, which uses two Pockels cells.

FIG. 2, already described, shows in graph form the polarisation voltages applied to the cells of the electro-optical switch in FIG. 1.

Figure 3:
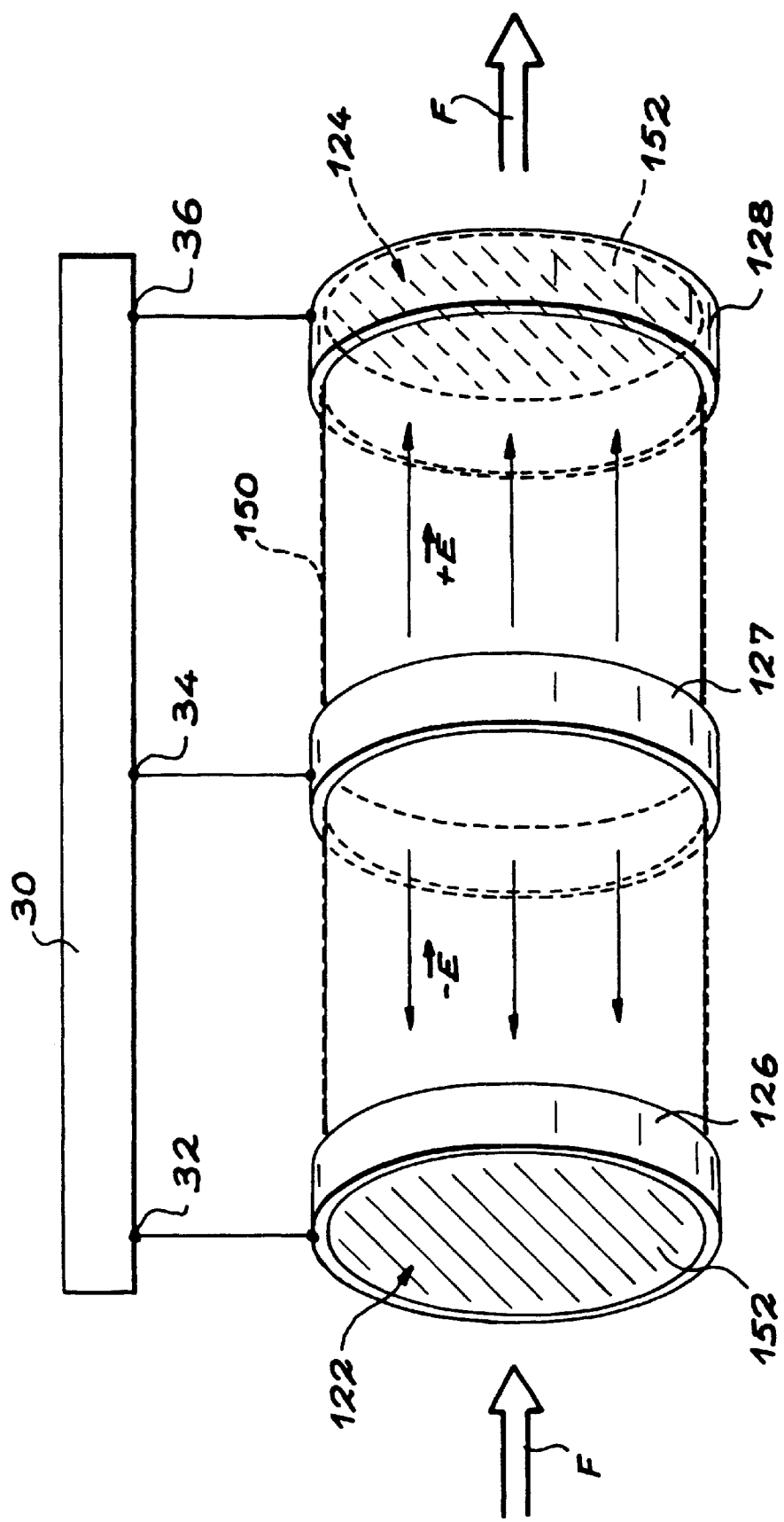

FIG. 3 gives a diagram of a dual Pockels cell, according to the invention, and an electro-optical device using this cell.

DETAILED DESCRIPTION OF ONE EMBODIMENT OF THE INVENTION

The Pockels cell shown in FIG. 3 is made from a crystal KDP bar 112 (potassium-dihydrogen-phosphate) that is deuterated or similar. The bar, in the form of a cylinder, has a length of approximately 40 mm and diameter in the order of 10 mm. This bar may be coated with a humidity-protection film 150.

Bar 112 has one first end face 122 and one second end face 124. These faces which form the inlet and outlet faces of the crystal are preferably treated according to the so-called sol-gel method to form an antireflective coating 152. The antireflective coating 152 is, for example, a fluorine polymer with a low refractive index ($n \cong 1.3$). In this way, it is possible to obtain a global light transmission coefficient of more than 98%.

In the figure, a light beam oriented along the axis of the cylindrical bar of the cell is shown in the form of arrows F.

First and second electrodes 126, 128 are formed on the bar at its ends, by evaporation, in the form of thin layers, in an electric conductor material such as NiCu. The electrodes are ring-shaped and are deposited on the circumference of the bar.

A third electrode 127 is formed on the surface of the KDP bar in substantially equidistant manner from the first and second electrodes.

The third electrode 127, also deposited by metal evaporation, is, like the first and second electrodes, in the shape of a ring or armillary sphere surrounding bar 112.

It may be noted that for reasons of clarity, the thicknesses of electrodes 126, 127, 128 are exaggerated in FIG. 3. This thickness is in the order of 10 $\mu$m.

The cell may be used in a modulator or an electro-optical switch. In this case, it is for example piloted by a MOSFET 30 transistor electronic circuit.

Circuit 30 in FIG. 3 has a first, a second and a third terminal 32, 34, 36 and is of the same type as the one used for the device in FIG. 1.

The first, second and third terminals 32, 34, 36 are respectively connected to the first 126, to the third 127 and to the second 128 electrode of the cell of the invention.

Therefore, for the functioning of the cell, reference may be made to FIG. 2 and to the corresponding description.

The voltage $V_0$ applied independently between the first and third electrodes and/or between the second electrode and the third electrode, is for example in the order of 4000 V. By way of example, a mass voltage of 0V may be permanently maintained on the third electrode 127 while the high voltage or the mass voltage is alternately applied to the first and second electrodes.

FIG. 3 shows fields $-\overline{E}$ and $+\overline{E}$ that are respectively set up in the crystal between the first 126 and third 127 electrodes and between the second 128 and third 127 electrodes when the potentials of the first, second and third electrodes are respectively $V_O$, 0 and $V_O$.

In other applications, the cell may be polarised such that the electric fields between the electrodes do not oppose one another but add up together.

Therefore, the components of the electric field of the beam crossing through the cell may undergo a phase difference, for example, of $\lambda/4+\lambda/4$, that is to say $\lambda/2$, in which $\lambda$ is the wave length of beam F. Said beam is therefore subjected to a phase difference $\lambda$ when it makes a return excursion through the cell.

What is claimed is:

1. Dual Pockels cell comprising:
    - a single bar (112) in birefractive material extending continuously between a first (122) and a second (124) end,
    - a first and a second electrode (126, 128), deposited on the ends of the bar, characterised in that it also comprises:
    - a third electrode (127) formed on the bar between the first and second electrodes.

2. Pockels cell according to claim 1, in which the third electrode (127) is substantially equidistant from said first and second electrodes (126, 128).

3. Pockels cell according to claim 1, in which the electrodes are ring-shaped electrodes deposited on the surface of the bar in the form of a ring surrounding said bar.

4. Pockels cell according to claim 1, in which the bar is coated with a humidity-protection film (150).

5. Pockels cell according to claim 1, in which the bar is in deuterated KDP (potassium-dihydrogen-phosphate).

6. Pockels cell according to claim 1, comprising first and second end faces provided with an antireflective coating (152).

7. Pockels cell according to claim 6, in which the antireflective coating (152) is in a fluorine polymer material with a low refractive index.

8. Electro-optical device comprising a single Pockels cell according to any of the preceding claims.

9. Electro-optical device according to claim 8, comprising an electronic circuit (30) to permanently connect the third electrode to a mass potential, and to connect independently and alternately the first and second electrodes (126, 128) to high voltage potential ($V_o$) and a mass potential.

* * * * *